(12) United States Patent
Margolis et al.

(10) Patent No.: US 8,732,058 B2
(45) Date of Patent: *May 20, 2014

(54) METHODS AND SYSTEMS FOR COMBINING SECURITIES AND CARBON CREDITS

(75) Inventors: Josh Margolis, San Anselmo, CA (US); Lawrence Trevor Gage, Maplewood, NJ (US); Scott Hartzell, Pelham, NY (US); Andrew Pritchard, Norwalk, CT (US)

(73) Assignee: CFPH, LLC, New York, NY (US)

( * ) Notice: Subject to any disclaimer, the term of this patent is extended or adjusted under 35 U.S.C. 154(b) by 337 days.

This patent is subject to a terminal disclaimer.

(21) Appl. No.: 12/581,125

(22) Filed: Oct. 17, 2009

(65) Prior Publication Data

US 2010/0049667 A1     Feb. 25, 2010

Related U.S. Application Data

(63) Continuation of application No. 11/675,294, filed on Feb. 15, 2007, now Pat. No. 7,636,681.

(60) Provisional application No. 60/882,094, filed on Dec. 27, 2006.

(51) Int. Cl.
    *G06Q 40/00*         (2012.01)

(52) U.S. Cl.
    USPC ................. 705/36 R; 705/35; 705/37; 705/64

(58) Field of Classification Search
    USPC ...................................... 705/35, 36 R, 37, 64
    See application file for complete search history.

(56) References Cited

U.S. PATENT DOCUMENTS

| | | | |
|---|---|---|---|
| 4,412,287 | A | 10/1983 | Braddock, III |
| 4,674,044 | A | 6/1987 | Kalmus et al. |
| 4,823,265 | A | 4/1989 | Nelson |
| 5,101,353 | A | 3/1992 | Lupien et al. |
| 5,126,936 | A | 6/1992 | Champion et al. |
| 5,132,899 | A | 7/1992 | Fox |
| 5,161,103 | A | 11/1992 | Kosaka et al. |

(Continued)

FOREIGN PATENT DOCUMENTS

| | | |
|---|---|---|
| JP | 2006-505027 | 2/2006 |
| JP | 2006-277597 | 10/2006 |

(Continued)

OTHER PUBLICATIONS

U.S. Appl. No. 60/882,094, filed Dec. 27, 2006, Margolis et al.

(Continued)

*Primary Examiner* — Muriel Tinkler
(74) *Attorney, Agent, or Firm* — Thomas D. Bradshaw

(57) ABSTRACT

Systems and methods are provided for reducing or neutralizing a carbon footprint of a security using carbon credit. At least one security that is excluded from an investment fund may be determined. A carbon footprint of the at least one security may be calculated. A first amount of carbon credit necessary to neutralize the carbon footprint of the at least one security may be determined. A second amount of carbon credit may be purchased based on the act of calculating the first amount of carbon credit necessary to neutralize the carbon footprint. A financial instrument determined to have an at least partially neutralized carbon footprint may be generated by causing the at least one security and the second amount of carbon credit to be stored in a trust.

29 Claims, 1 Drawing Sheet

(56) References Cited

U.S. PATENT DOCUMENTS

| | | | |
|---|---|---|---|
| 5,193,056 A | 3/1993 | Boes | |
| 5,214,579 A | 5/1993 | Wolfberg et al. | |
| 5,270,922 A | 12/1993 | Higgins | |
| 5,689,651 A | 11/1997 | Lozman | |
| 5,761,442 A | 6/1998 | Barr et al. | |
| 5,761,661 A | 6/1998 | Coussens et al. | |
| 5,778,357 A | 7/1998 | Kolton et al. | |
| 5,799,287 A | 8/1998 | Dembo | |
| 5,806,048 A | 9/1998 | Kiron et al. | |
| 5,884,287 A | 3/1999 | Edesess | |
| 5,893,079 A | 4/1999 | Cwenar | |
| 5,946,667 A | 8/1999 | Tull, Jr. et al. | |
| 5,950,176 A | 9/1999 | Keiser et al. | |
| 6,018,722 A | 1/2000 | Ray et al. | |
| 6,021,397 A | 2/2000 | Jones et al. | |
| 6,088,685 A | 7/2000 | Kiron et al. | |
| 6,278,981 B1 | 8/2001 | Dembo et al. | |
| 6,484,151 B1 | 11/2002 | O'Shaughnessy | |
| 6,594,643 B1 | 7/2003 | Freeny | |
| 6,601,044 B1 | 7/2003 | Wallman | |
| 6,778,968 B1 | 8/2004 | Gulati | |
| 6,876,982 B1 | 4/2005 | Lancaster | |
| 6,947,901 B1 | 9/2005 | McCabe et al. | |
| 6,996,539 B1 | 2/2006 | Wallman | |
| 7,110,971 B2 | 9/2006 | Wallman | |
| 7,117,176 B2 | 10/2006 | Wallman | |
| 7,149,713 B2 | 12/2006 | Bove et al. | |
| 7,177,831 B1 | 2/2007 | O'Shaughnessy et al. | |
| 7,249,075 B1 | 7/2007 | Altomare et al. | |
| 7,249,080 B1 | 7/2007 | Hoffman et al. | |
| 7,337,136 B1 | 2/2008 | Burns et al. | |
| 7,356,498 B2 | 4/2008 | Kaminsky et al. | |
| 7,359,875 B1 | 4/2008 | Millette et al. | |
| 7,379,911 B2 | 5/2008 | Lutnick | |
| 7,389,261 B1 | 6/2008 | Kumar et al. | |
| 7,487,122 B2 | 2/2009 | Lipper, III | |
| 7,536,332 B2 | 5/2009 | Rhee | |
| 7,546,267 B2 | 6/2009 | Wallman | |
| 7,552,079 B2 | 6/2009 | Bove et al. | |
| 7,552,082 B2 | 6/2009 | Wallman | |
| 7,636,681 B2 | 12/2009 | Margolis et al. | |
| 7,640,200 B2 | 12/2009 | Gardner et al. | |
| 7,668,773 B1 | 2/2010 | Pruitt | |
| 7,685,046 B2 | 3/2010 | Wallman | |
| 7,689,494 B2 | 3/2010 | Torre et al. | |
| 7,707,093 B2 | 4/2010 | O'Shaughnessy et al. | |
| 7,739,172 B2 | 6/2010 | Voudrie | |
| 7,739,183 B2 | 6/2010 | Voudrie | |
| 7,917,424 B2 | 3/2011 | Lutnick | |
| 2001/0025264 A1 | 9/2001 | Deaddio et al. | |
| 2001/0025266 A1 | 9/2001 | Gastineau et al. | |
| 2001/0049651 A1 | 12/2001 | Selleck | |
| 2002/0026403 A1 | 2/2002 | Tambay et al. | |
| 2002/0046154 A1 | 4/2002 | Pritchard | |
| 2002/0099640 A1 | 7/2002 | Lange | |
| 2002/0128941 A1 | 9/2002 | Champion et al. | |
| 2002/0133447 A1 | 9/2002 | Mastman | |
| 2002/0147670 A1 | 10/2002 | Lange | |
| 2002/0161690 A1 | 10/2002 | McCarthy et al. | |
| 2003/0004851 A2 | 1/2003 | Kiron et al. | |
| 2003/0028468 A1 | 2/2003 | Wong et al. | |
| 2003/0046218 A1 | 3/2003 | Albanese et al. | |
| 2003/0069826 A1 | 4/2003 | Guidi et al. | |
| 2003/0097328 A1 | 5/2003 | Lundberg et al. | |
| 2003/0126062 A1 | 7/2003 | Gilbert | |
| 2003/0200169 A1 | 10/2003 | Freeny | |
| 2003/0233308 A1 | 12/2003 | Lundberg et al. | |
| 2004/0024677 A1 | 2/2004 | Wallman | |
| 2004/0039684 A1* | 2/2004 | Sandor | 705/37 |
| 2004/0230443 A1* | 11/2004 | McMorris et al. | 705/1 |
| 2004/0230512 A1 | 11/2004 | Gulati | |
| 2005/0091133 A1* | 4/2005 | Ballman | 705/35 |
| 2005/0108148 A1 | 5/2005 | Carlson | |
| 2005/0273411 A1 | 12/2005 | Voudrie | |
| 2005/0283428 A1* | 12/2005 | Bartels et al. | 705/37 |
| 2006/0069635 A1 | 3/2006 | Ram et al. | |
| 2006/0089851 A1 | 4/2006 | Silby et al. | |
| 2006/0184445 A1* | 8/2006 | Sandor et al. | 705/37 |
| 2007/0016511 A1* | 1/2007 | Walsh et al. | 705/37 |
| 2007/0033129 A1 | 2/2007 | Coates | |
| 2007/0208645 A1 | 9/2007 | Hoffman et al. | |
| 2008/0162372 A1 | 7/2008 | Margolis et al. | |
| 2008/0313099 A1 | 12/2008 | Billings et al. | |
| 2009/0276372 A1 | 11/2009 | Wallman | |
| 2010/0088210 A1 | 4/2010 | Gardner et al. | |
| 2011/0295735 A1 | 12/2011 | Lutnick | |
| 2013/0124379 A1 | 5/2013 | Gilbert | |
| 2013/0132300 A1 | 5/2013 | Margolis et al. | |

FOREIGN PATENT DOCUMENTS

| | | |
|---|---|---|
| JP | 2008-518360 | 5/2008 |
| WO | WO 98/49639 | 11/1998 |
| WO | WO 99/01983 | 1/1999 |
| WO | WO 00/26745 | 5/2000 |
| WO | WO 01/33316 A2 | 5/2001 |
| WO | WO 2006/049950 | 5/2006 |

OTHER PUBLICATIONS

USPTO Examiner Interview Summary for U.S. Appl. No. 11/675,294, Nov. 16, 2009 (3 pages).
USPTO Response to Amendment under Rule 312 for U.S. Appl. No. 11/675,294, Nov. 19, 2009 (2 pages).
International Preliminary Report on Patentability for International Application No. PCT/US08/53533, Aug. 19, 2009 (5 pages).
Australian Examiner's Report for Application No. 2008216436, dated Jul. 30, 2010 (2 pages).
International Search Report and Written Opinion for International Application No. PCT/US08/53533, dated Jul. 21, 2008 (6 pages).
USPTO Office Action for U.S. Appl. No. 11/675,294, Sep. 15, 2008 (7 pages).
USPTO Examiner Interview Summary for U.S. Appl. No. 11/675,294, Jun. 9, 2009 (2 pages).
USPTO Notice of Allowance for U.S. Appl. No. 11/675,294, Jul. 9, 2009 (15 pages).
USPTO Examiner Interview Summary for U.S. Appl. No. 11/675,294, Jul. 9, 2009 (1 page).
USPTO Examiner Interview Summary for U.S. Appl. No. 11/675,294, Aug. 20, 2009 (4 page).
U.S. Appl. No. 60/228,142, filed Aug. 25, 2000, Pritchard.
Collins Dictionary of Business, 1995, retrieved from xreferplus.com, defining securitization.
Penguin Business Dictionary, 1994, retrieved from xreferplus.com, defining options.
USPTO Office Action for U.S. Appl. No. 09/927,628, Aug. 8, 2006 (5 pages).
USPTO Office Action for U.S. Appl. No. 09/927,628, May 1, 2007 (7 pages).
USPTO Office Action for U.S. Appl. No. 09/927,628, Nov. 16, 2007 (9 pages).
United States Department of the Treasury, Bureau of the Public Debt, at http://www.publicdebt.treas.gov, printed Aug. 25, 2004.
Actively Managed Exchange-Traded Funds, Investment Company Act Release No. 25258 (2001 SEC LEXIS 2363), Nov. 8, 2001.
Merrill Lynch, Pierce, Fenner & Smith Incorporated, SEC No Action Letter (1999 SEC No-Act. LEXIS 737), pub. avail. Sep. 3, 1999.
Indosuez Asset Management Asia Limited, SEC No Action Letter (1997 SEC No-Act. LEXIS 326), pub. avail. Feb. 14, 1997.
Commonwealth Bank of Australia, SEC No Action Letter (1996 SEC No-Act. LEXIS 865), pub. avail. Sep. 23, 1996.
Robertson, Stephens & Company, SEC No Action Letter (1993 SEC No-Act. LEXIS 435), pub. avail. Mar. 13, 1993.
CRT Government Securities, Ltd., SEC No Action Letter (1992 SEC No-Act. LEXIS 844), pub. avail. Aug. 4, 1992.
Bear, Stearns & Co., Inc., SEC No Action Letter (1992 SEC No-Act. LEXIS 81), pub. avail. Jan. 28, 1992.
Merrill Lynch, Pierce, Fenner & Smith, Inc., SEC No Action Letter (1990 SEC No-Act. LEXIS 1136), pub. avail. Sep. 26, 1990.

(56) References Cited

OTHER PUBLICATIONS

Financial Security Assurance Inc., SEC No Action Letter (1988 SEC No-Act. LEXIS 456), pub. avail. Mar. 30, 1988.
Central Utah Rural Impact Capital Corp., SEC No Action Letter (1980 SEC No-Act. LEXIS 3589), pub. avail. Aug. 29, 1980.
Standard & Poor's Depository Receipts® ("SPDRs")®, SPDR Trust, Series 1, A Unit Investment Trust, prospectus dated Apr. 25, 1996.
Jinny St. Goar, "Weaving WEBs and Baskets," from the Internet at http://www.assetpub.com/archive/gc/96-02gcsummer/summer96GC086.html, printed on Aug. 2, 2000.
John Downes & Jordan Elliot Goodman, Dictionary of Finance and Investment Terms, 297-298, 301 (5th ed. 1998).
USPTO Office Action for U.S. Appl. No. 10/042,371, Nov. 9, 2006 (22 pgs).
USPTO Office Action for U.S. Appl. No. 10/042,371, Apr. 4, 2007 (11 pgs).
USPTO Office Action for U.S. Appl. No. 10/042,371, Jul. 5, 2007 (3 pgs).
USPTO Office Action for U.S. Appl. No. 10/042,371, Mar. 7, 2008 (17 pages).
USPTO Office Action for U.S. Appl. No. 09/927,628, May 14, 2008 (7 pages).
USPTO Office Action for U.S. Appl. No. 09/927,628, Jul. 22, 2008 (9 pages).
USPTO Office Action for U.S. Appl. No. 10/329,103, Dec. 21, 2004 (15 pages).
USPTO Office Action for U.S. Appl. No. 10/329,103, Jun. 27, 2005 (10 pages).
USPTO Office Action for U.S. Appl. No. 10/329,103, Sep. 26, 2005 (3 pages).
USPTO Office Action for U.S. Appl. No. 10/329,103, Dec. 29, 2005 (13 pages).
USPTO Office Action for U.S. Appl. No. 10/329,103, Jun. 19, 2006 (14 pages).
U.S. Appl. No. 60/343,885, filed Dec. 26, 2001, Lutnick.
USPTO Office Action for U.S. Appl. No. 10/329,103, Dec. 1, 2006 (14 pages).
USPTO Office Action for U.S. Appl. No. 10/329,103, Jun. 25, 2007 (8 pages).
USPTO Office Action for U.S. Appl. No. 10/329,103, Oct. 17, 2007 (3 pages).
Barron's Dictionary Finance and Investment Terms, 6th Edition, Downes and Goodman, Editors, Copyright 1985, 1987, 1991, 1995, 1998, 2003, Happauge, NY, p. 304.
Barron's Dictionary of Business Terms, 3rd Edition, Barron's Educational Series, 2000, pp. 118, 662.
John Downes et al., "Dictionary of Finance and Investment Terms," 1998, 5th Edition, pp. 380 and 689.
USPTO Office Action for U.S. Appl. No. 12/119,604, Nov. 24, 2008 (9 pages).
USPTO Office Action for U.S. Appl. No. 10/042,371, Feb. 20, 2009 (12 pages).
USPTO Office Action for U.S. Appl. No. 09/927,628, Feb. 27, 2009 (10 pages).
USPTO Office Action for U.S. Appl. No. 09/927,628, Dec. 21, 2009 (11 pages).
USPTO Office Action for U.S. Appl. No. 12/119,604, Aug. 31, 2009 (12 pages).
International Search Report for International Application No. PCT/US01/25022, dated Dec. 26, 2001 (3 pages).
International Preliminary Examination Report for International Application No. PCT/US01/25022, dated Mar. 4, 2002 (3 pages).
PCT Written Opinion for International Application No. PCT/US01/25022, dated Nov. 21, 2002 (4 pages).
UK Examination Report for Application No. GB0304530.9, dated Jan. 20, 2004 (3 pages).
UK Examination Report for Application No. GB0304530.9, dated Aug. 6, 2004 (3 pages).
UK Examination Report for Application No. GB0416208.7, dated Dec. 9, 2004 (2 pages).
International Search Report for International Application No. PCT/US02/40814, dated Sep. 8, 2003 (1 page).
USPTO Examiner's Answer to Appeal Brief for U.S. Appl. No. 10/042,371, Jun. 9, 2010 (13 pages).
USPTO Examiner Interview Summary Record for U.S. Appl. No. 12/119,604, Feb. 26, 2010 (3 pages).
USPTO Notice of Allowance and Fees Due for U.S. Appl. No. 12/119,604, Jun. 11, 2010 (14 pages).
USPTO Examiner Interview Summary Record for U.S. Appl. No. 10/329,103, Oct. 3, 2007 (3 pages).
USPTO Examiner Interview Summary Record for U.S. Appl. No. 10/329,103, Nov. 14, 2007 (3 pages).
USPTO Examiner Interview Summary Record for U.S. Appl. No. 10/329,103, Jan. 31, 2008 (3 pages).
USPTO Notice of Allowance and Fees Due for U.S. Appl. No. 10/329,103, Jan. 29, 2008 (11 pages).
USPTO Petition Decision for U.S. Appl. No. 09/927,628, Aug. 30, 2010 (2 pages).
USPTO Administrative Remand to Examiner for U.S. Appl. No. 10/042,371, Sep. 21, 2010 (3 pages).
USPTO Office Action for U.S. Appl. No. 09/927,628, Oct. 25, 2010 (11 pages).
USPTO Notice of Allowance and Fees Due for U.S. Appl. No. 12/119,604, Nov. 22, 2010 (15 pages).
USPTO Office Action for U.S. Appl. No. 09/927,628, May 6, 2011 (12 pages).
USPTO Petition Decision for U.S. Appl. No. 10/042,371, Aug. 5, 2011 (3 pages).
USPTO Office Action for U.S. Appl. No. 09/927,628, Nov. 8, 2011 (3 pages).
USPTO Pre-Brief Appeal Conference Decision for U.S. Appl. No. 09/927,628, Dec. 8, 2011 (12 pages).
Canadian Office Action for Application No. 2471556, dated Oct. 19, 2011 (5 pages).
European Communication and Supplementary Search Report for Application No. 08729486.4 dated Nov. 14, 2011 (12 pages).
USPTO Office Action for U.S. Appl. No. 13/072,878, Mar. 29, 2012 (6 pages).
Canadian Office Action for Application No. 2420690, dated Nov. 15, 2011 (3 pages).
Canadian Office Action for Application No. 2678497, dated May 1, 2012 (2 pages).
USPTO Decision on Appeal for U.S. Appl. No. 10/042,371, Jul. 26, 2013 (5 pages).
Canadian Office Action for Application No. 2471556, dated Apr. 3, 2013 (5 pages).
USPTO Office Action for U.S. Appl. No. 13/072,878, Aug. 29, 2012 (19 pages).
USPTO Final Office Action for U.S. Appl. No. 13/072,878, Jul. 3, 2013 (34 pages).
Australian Examiner's Report for Application No. 2012202467 dated Jan. 14, 2013 (2 pages).
Canadian Office Action for Application No. 2678497, dated Jun. 6, 2013 (8 pages).
USPTO Decision on Appeal for U.S. Appl. No. 10/042,371, Jul. 26, 2013 (10 pages).
USPTO Notice of Allowance and Fees Due for U.S. Appl. No. 10/042,371, Oct. 23, 2013 (10 pages).
Bias, et al. Dynamic Security Design: Convergence to Continious Time and Asset Pricing Implications.: The Review of Economic Studies 74.2 (2007): 345-390.
Keahey, et al. Dynamic Creation and Management of Runtime Environments in the Grid. Workshop on Designing and Building Web Services (to appear). 2003.
Chen, et al. "The Dynamic Relation Between Stock Returns, Trading Volume, and Votality." Financial Review 36.3 (2001): 153-174.
Foster, et al. "A Security Architecture for Computational Grids" Proceeding of the 5th ACM conference on Computer and communications security. ACM, 1998.

* cited by examiner

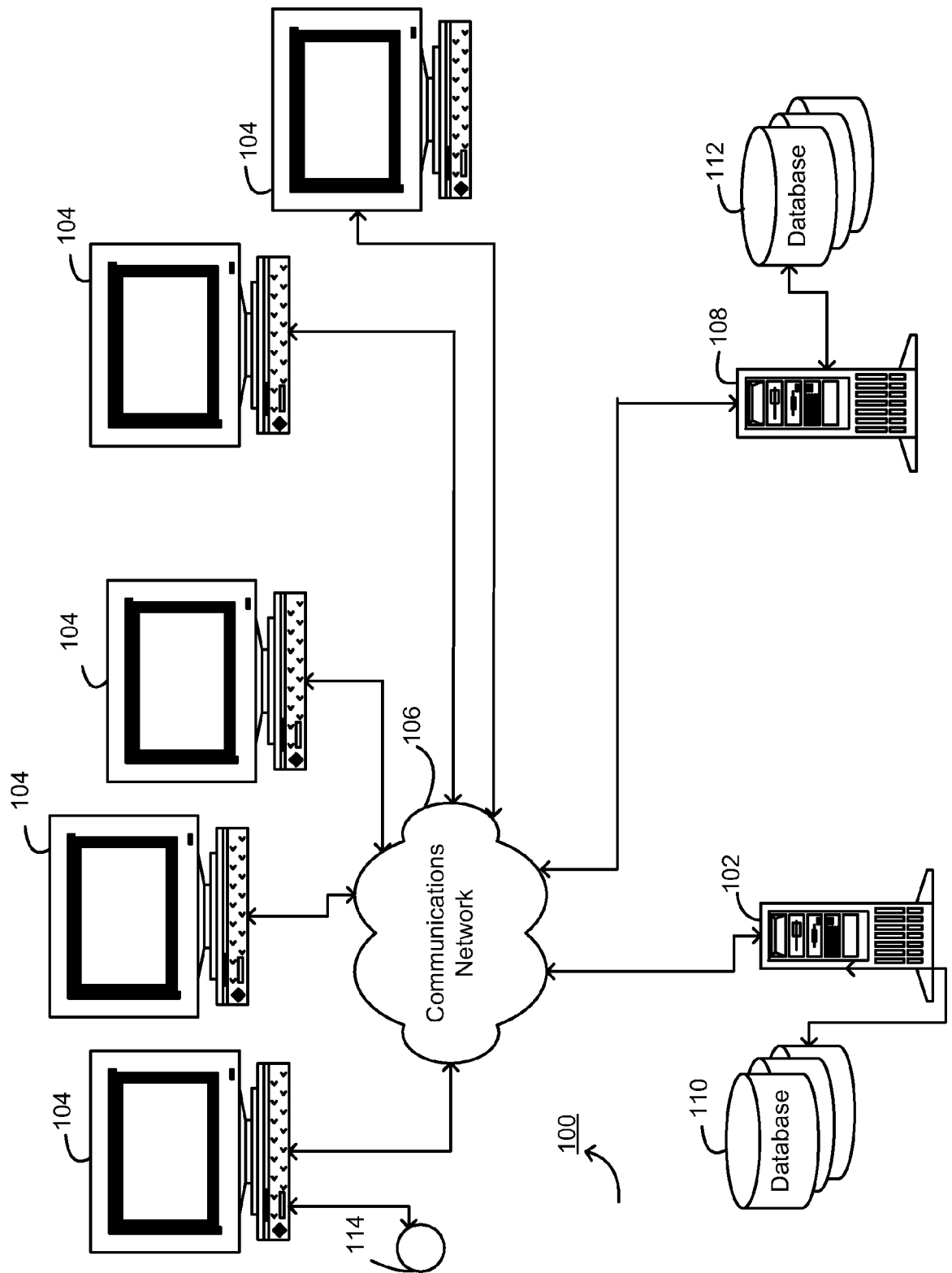

METHODS AND SYSTEMS FOR COMBINING SECURITIES AND CARBON CREDITS

This application is a continuation of U.S. patent application Ser. No. 11/675,294, filed Feb. 15, 2007 now U.S. Pat. No. 7,636,681 and entitled "Methods and Systems for Generating an Investment Trust Comprising Neutralized Securities", which claims the benefit of U.S. Provisional Application Ser. No. 60/882,094, filed on Dec. 27, 2006, entitled "Methods and Systems for Generating an Investment Trust Comprising Neutralized Securities", both of which are incorporated by reference herein in their entireties.

BRIEF DESCRIPTION OF THE FIGURES

FIG. 1 illustrates a system according to at least one embodiment of the systems disclosed herein.

DETAILED DESCRIPTION

The following sections I-X provide a guide to interpreting the present application.

I. Terms

The term "product" means any machine, manufacture and/or composition of matter, unless expressly specified otherwise.

The term "process" means any process, algorithm, method or the like, unless expressly specified otherwise.

Each process (whether called a method, algorithm or otherwise) inherently includes one or more steps, and therefore all references to a "step" or "steps" of a process have an inherent antecedent basis in the mere recitation of the term 'process' or a like term. Accordingly, any reference in a claim to a 'step' or 'steps' of a process has sufficient antecedent basis.

The term "invention" and the like mean "the one or more inventions disclosed in this application", unless expressly specified otherwise.

The terms "an embodiment", "embodiment", "embodiments", "the embodiment", "the embodiments", "one or more embodiments", "some embodiments", "certain embodiments", "one embodiment", "another embodiment" and the like mean "one or more (but not all) embodiments of the disclosed invention(s)", unless expressly specified otherwise.

The term "variation" of an invention means an embodiment of the invention, unless expressly specified otherwise.

A reference to "another embodiment" in describing an embodiment does not imply that the referenced embodiment is mutually exclusive with another embodiment (e.g., an embodiment described before the referenced embodiment), unless expressly specified otherwise.

The terms "including", "comprising" and variations thereof mean "including but not limited to", unless expressly specified otherwise.

The terms "a", "an" and "the" mean "one or more", unless expressly specified otherwise.

The term "plurality" means "two or more", unless expressly specified otherwise.

The term "herein" means "in the present application, including anything which may be incorporated by reference", unless expressly specified otherwise.

The phrase "at least one of", when such phrase modifies a plurality of things (such as an enumerated list of things) means any combination of one or more of those things, unless expressly specified otherwise. For example, the phrase "at least one of a widget, a car and a wheel" means either (i) a widget, (ii) a car, (iii) a wheel, (iv) a widget and a car, (v) a widget and a wheel, (vi) a car and a wheel, or (vii) a widget, a car and a wheel. The phrase "at least one of", when such phrase modifies a plurality of things does not mean "one of each of" the plurality of things.

Numerical terms such as "one", "two", etc. when used as cardinal numbers to indicate quantity of something (e.g., one widget, two widgets), mean the quantity indicated by that numerical term, but do not mean at least the quantity indicated by that numerical term. For example, the phrase "one widget" does not mean "at least one widget", and therefore the phrase "one widget" does not cover, e.g., two widgets.

The phrase "based on" does not mean "based only on", unless expressly specified otherwise. In other words, the phrase "based on" describes both "based only on" and "based at least on". The phrase "based at least on" is equivalent to the phrase "based at least in part on".

The term "represent" and like terms are not exclusive, unless expressly specified otherwise. For example, the term "represents" do not mean "represents only", unless expressly specified otherwise. In other words, the phrase "the data represents a credit card number" describes both "the data represents only a credit card number" and "the data represents a credit card number and the data also represents something else".

The term "whereby" is used herein only to precede a clause or other set of words that express only the intended result, objective or consequence of something that is previously and explicitly recited. Thus, when the term "whereby" is used in a claim, the clause or other words that the term "whereby" modifies do not establish specific further limitations of the claim or otherwise restricts the meaning or scope of the claim.

The term "e.g." and like terms mean "for example", and thus does not limit the term or phrase it explains. For example, in the sentence "the computer sends data (e.g., instructions, a data structure) over the Internet", the term "e.g." explains that "instructions" are an example of "data" that the computer may send over the Internet, and also explains that "a data structure" is an example of "data" that the computer may send over the Internet. However, both "instructions" and "a data structure" are merely examples of "data", and other things besides "instructions" and "a data structure" can be "data".

The term "respective" and like terms mean "taken individually". Thus if two or more things have "respective" characteristics, then each such thing has its own characteristic, and these characteristics can be different from each other but need not be. For example, the phrase "each of two machines has a respective function" means that the first such machine has a function and the second such machine has a function as well. The function of the first machine may or may not be the same as the function of the second machine.

The term "i.e." and like terms mean "that is", and thus limits the term or phrase it explains. For example, in the sentence "the computer sends data (i.e., instructions) over the Internet", the term "i.e." explains that "instructions" are the "data" that the computer sends over the Internet.

Any given numerical range shall include whole and fractions of numbers within the range. For example, the range "1 to 10" shall be interpreted to specifically include whole numbers between 1 and 10 (e.g., 1, 2, 3, 4, . . . 9) and non-whole numbers (e.g., 1.1, 1.2, . . . 1.9).

Where two or more terms or phrases are synonymous (e.g., because of an explicit statement that the terms or phrases are synonymous), instances of one such term/phrase does not mean instances of another such term/phrase must have a different meaning. For example, where a statement renders the meaning of "including" to be synonymous with "including but not limited to", the mere usage of the phrase "including but not limited to" does not mean that the term "including" means something other than "including but not limited to".

II. Determining

The term "determining" and grammatical variants thereof (e.g., to determine a price, determining a value, determine an object which meets a certain criterion) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

The term "determining" does not imply certainty or absolute precision, and therefore "determining" can include estimating, extrapolating, predicting, guessing and the like.

The term "determining" does not imply that mathematical processing must be performed, and does not imply that numerical methods must be used, and does not imply that an algorithm or process is used.

The term "determining" does not imply that any particular device must be used. For example, a computer need not necessarily perform the determining.

III. Forms of Sentences

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to the limitation (e.g., "the widget"), this does not imply that the first claim covers only one of the feature, and this does not imply that the second claim covers only one of the feature (e.g., "the widget" can cover both one widget and more than one widget).

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. In addition, the mere usage of ordinal numbers does not define a numerical limit to the features identified with the ordinal numbers. For example, the mere usage of the ordinal numbers "first" and "second" before the term "widget" does not indicate that there must be no more than two widgets.

When a single device, article or other product is described herein, more than one device/article (whether or not they cooperate) may alternatively be used in place of the single device/article that is described. Accordingly, the functionality that is described as being possessed by a device may alternatively be possessed by more than one device/article (whether or not they cooperate).

Similarly, where more than one device, article or other product is described herein (whether or not they cooperate), a single device/article may alternatively be used in place of the more than one device or article that is described. For example, a plurality of computer-based devices may be substituted with a single computer-based device. Accordingly, the various functionality that is described as being possessed by more than one device or article may alternatively be possessed by a single device/article.

The functionality and/or the features of a single device that is described may be alternatively embodied by one or more other devices which are described but are not explicitly described as having such functionality/features. Thus, other embodiments need not include the described device itself, but rather can include the one or more other devices which would, in those other embodiments, have such functionality/features.

IV. Disclosed Examples and Terminology are not Limiting

Neither the Title (set forth at the beginning of the first page of the present application) nor the Abstract (set forth at the end of the present application) is to be taken as limiting in any way as the scope of the disclosed invention(s). An Abstract has been included in this application merely because an Abstract of not more than 150 words is required under 37 C.F.R. §1.72(b).

The title of the present application and headings of sections provided in the present application are for convenience only, and are not to be taken as limiting the disclosure in any way.

Numerous embodiments are described in the present application, and are presented for illustrative purposes only. The described embodiments are not, and are not intended to be, limiting in any sense. The presently disclosed invention(s) are widely applicable to numerous embodiments, as is readily apparent from the disclosure. One of ordinary skill in the art will recognize that the disclosed invention(s) may be practiced with various modifications and alterations, such as structural, logical, software, and electrical modifications. Although particular features of the disclosed invention(s) may be described with reference to one or more particular embodiments and/or drawings, it should be understood that such features are not limited to usage in the one or more particular embodiments or drawings with reference to which they are described, unless expressly specified otherwise.

No embodiment of method steps or product elements described in the present application constitutes the invention claimed herein, or is essential to the invention claimed herein, or is coextensive with the invention claimed herein, except where it is either expressly stated to be so in this specification or expressly recited in a claim.

All words in every claim have the broadest scope of meaning they would have been given by a person of ordinary skill in the art as of the priority date. No term used in any claim is specially defined or limited by this application except where expressly so stated either in this specification or in a claim.

The preambles of the claims that follow recite purposes, benefits and possible uses of the claimed invention only and do not limit the claimed invention.

The present disclosure is not a literal description of all embodiments of the invention(s). Also, the present disclosure is not a listing of features of the invention(s) which must be present in all embodiments.

Devices that are described as in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for long period of time (e.g. weeks at a time). In addition, devices that are in communication with each other may communicate directly or indirectly through one or more intermediaries.

A description of an embodiment with several components or features does not imply that all or even any of such components/features are required. On the contrary, a variety of optional components are described to illustrate the wide variety of possible embodiments of the present invention(s). Unless otherwise specified explicitly, no component/feature is essential or required.

Although process steps, algorithms or the like may be described or claimed in a particular sequential order, such processes may be configured to work in different orders. In other words, any sequence or order of steps that may be explicitly described or claimed does not necessarily indicate a requirement that the steps be performed in that order. The steps of processes described herein may be performed in any order possible. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention(s), and does not imply that the illustrated process is preferred.

Although a process may be described as including a plurality of steps, that does not imply that all or any of the steps are preferred, essential or required. Various other embodiments within the scope of the described invention(s) include other processes that omit some or all of the described steps. Unless otherwise specified explicitly, no step is essential or required.

Although a process may be described singly or without reference to other products or methods, in an embodiment the process may interact with other products or methods. For example, such interaction may include linking one business model to another business model. Such interaction may be provided to enhance the flexibility or desirability of the process.

Although a product may be described as including a plurality of components, aspects, qualities, characteristics and/or features, that does not indicate that any or all of the plurality are preferred, essential or required. Various other embodiments within the scope of the described invention(s) include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, a PDA" does not imply that any or all of the three items of that list are mutually exclusive and does not imply that any or all of the three items of that list are comprehensive of any category.

An enumerated list of items (which may or may not be numbered) does not imply that any or all of the items are equivalent to each other or readily substitutable for each other.

All embodiments are illustrative, and do not imply that the invention or any embodiments were made or performed, as the case may be.

V. Computing

It will be readily apparent to one of ordinary skill in the art that the various processes described herein may be implemented by, e.g., appropriately programmed general purpose computers, special purpose computers and computing devices. Typically a processor (e.g., one or more microprocessors, one or more microcontrollers, one or more digital signal processors) will receive instructions (e.g., from a memory or like device), and execute those instructions, thereby performing one or more processes defined by those instructions. Instructions may be embodied in, e.g., a computer program.

A "processor" means one or more microprocessors, central processing units (CPUs), computing devices, microcontrollers, digital signal processors, or like devices or any combination thereof.

Thus a description of a process is likewise a description of an apparatus for performing the process. The apparatus that performs the process can include, e.g., a processor and those input devices and output devices that are appropriate to perform the process.

Further, programs that implement such methods (as well as other types of data) may be stored and transmitted using a variety of media (e.g., computer readable media) in a number of manners. In some embodiments, hard-wired circuitry or custom hardware may be used in place of, or in combination with, some or all of the software instructions that can implement the processes of various embodiments. Thus, various combinations of hardware and software may be used instead of software only.

The term "computer-readable medium" refers to any medium, a plurality of the same, or a combination of different media, that participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying data (e.g. sequences of instructions) to a processor. For example, data may be (i) delivered from RAM to a processor; (ii) carried over a wireless transmission medium; (iii) formatted and/or transmitted according to numerous formats, standards or protocols, such as Ethernet (or IEEE 802.3), SAP, ATP, Bluetooth™, and TCP/IP, TDMA, CDMA, and 3G; and/or (iv) encrypted to ensure privacy or prevent fraud in any of a variety of ways well known in the art.

Thus a description of a process is likewise a description of a computer-readable medium storing a program for performing the process. The computer-readable medium can store (in any appropriate format) those program elements which are appropriate to perform the method.

Just as the description of various steps in a process does not indicate that all the described steps are required, embodiments of an apparatus include a computer/computing device operable to perform some (but not necessarily all) of the described process.

Likewise, just as the description of various steps in a process does not indicate that all the described steps are required, embodiments of a computer-readable medium storing a program or data structure include a computer-readable medium storing a program that, when executed, can cause a processor to perform some (but not necessarily all) of the described process.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as the described herein. In addition, the databases may, in a known manner, be stored locally or remotely from a device which accesses data in such a database.

Various embodiments can be configured to work in a network environment including a computer that is in communication (e.g., via a communications network) with one or more devices. The computer may communicate with the devices directly or indirectly, via any wired or wireless medium (e.g. the Internet, LAN, WAN or Ethernet, Token Ring, a telephone line, a cable line, a radio channel, an optical communications line, commercial on-line service providers, bulletin board systems, a satellite communications link, a combination of any of the above). Each of the devices may themselves comprise computers or other computing devices, such as those based on the Intel® Pentium® or Centrino™ processor, that are adapted to communicate with the computer. Any number and type of devices may be in communication with the computer.

In an embodiment, a server computer or centralized authority may not be necessary or desirable. For example, the present invention may, in an embodiment, be practiced on one or more devices without a central authority. In such an embodiment, any functions described herein as performed by the server computer or data described as stored on the server computer may instead be performed by or stored on one or more such devices.

Where a process is described, in an embodiment the process may operate without any user intervention. In another embodiment, the process includes some human intervention (e.g., a step is performed by or with the assistance of a human).

VI. Continuing Applications

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application.

Applicants intend to file additional applications to pursue patents for subject matter that has been disclosed and enabled but not claimed in the present application.

VII. 35 U.S.C. §112, Paragraph 6

In a claim, a limitation of the claim which includes the phrase "means for" or the phrase "step for" means that 35 U.S.C. §112, paragraph 6, applies to that limitation.

In a claim, a limitation of the claim which does not include the phrase "means for" or the phrase "step for" means that 35 U.S.C. §112, paragraph 6 does not apply to that limitation, regardless of whether that limitation recites a function without recitation of structure, material or acts for performing that function. For example, in a claim, the mere use of the phrase "step of" or the phrase "steps of" in referring to one or more steps of the claim or of another claim does not mean that 35 U.S.C. §112, paragraph 6, applies to that step(s).

With respect to a means or a step for performing a specified function in accordance with 35 U.S.C. §112, paragraph 6, the corresponding structure, material or acts described in the specification, and equivalents thereof, may perform additional functions as well as the specified function.

Computers, processors, computing devices and like products are structures that can perform a wide variety of functions. Such products can be operable to perform a specified function by executing one or more programs, such as a program stored in a memory device of that product or in a memory device which that product accesses. Unless expressly specified otherwise, such a program need not be based on any particular algorithm, such as any particular algorithm that might be disclosed in the present application. It is well known to one of ordinary skill in the art that a specified function may be implemented via different algorithms, and any of a number of different algorithms would be a mere design choice for carrying out the specified function.

Therefore, with respect to a means or a step for performing a specified function in accordance with 35 U.S.C. §112, paragraph 6, structure corresponding to a specified function includes any product programmed to perform the specified function. Such structure includes programmed products which perform the function, regardless of whether such product is programmed with (i) a disclosed algorithm for performing the function, (ii) an algorithm that is similar to a disclosed algorithm, or (iii) a different algorithm for performing the function.

Where there is recited a means for performing a function hat is a method, one structure for performing this method includes a computing device (e.g., a general purpose computer) that is programmed and/or configured with appropriate hardware to perform that function.

Also includes a computing device (e.g., a general purpose computer) that is programmed and/or configured with appropriate hardware to perform that function via other algorithms as would be understood by one of ordinary skill in the art.

VIII. Disclaimer

Numerous references to a particular embodiment does not indicate a disclaimer or disavowal of additional, different embodiments, and similarly references to the description of embodiments which all include a particular feature does not indicate a disclaimer or disavowal of embodiments which do not include that particular feature. A clear disclaimer or disavowal in the present application shall be prefaced by the phrase "does not include" or by the phrase "cannot perform".

IX. Incorporation by Reference

Any patent, patent application or other document referred to herein is incorporated by reference into this patent application as part of the present disclosure, but only for purposes of written description in accordance with 35 U.S.C. §112, paragraph 1 and enablement in accordance with 35 U.S.C. §112, paragraph 1, and should in no way be used to limit, define, or otherwise construe any term of the present application where the present application, without such incorporation by reference, would not have failed to provide an ascertainable meaning, but rather would have allowed an ascertainable meaning for such term to be provided. Thus, the person of ordinary skill in the art need not have been in any way limited by any embodiments provided in the reference.

Any incorporation by reference does not, in and of itself, imply any endorsement of, ratification of or acquiescence in any statements, opinions, arguments or characterizations contained in any incorporated patent, patent application or other document, unless explicitly specified otherwise in this patent application.

X. Prosecution History

In interpreting the present application (which includes the claims), one of ordinary skill in the art shall refer to the prosecution history of the present application, but not to the prosecution history of any other patent or patent application, regardless of whether there are other patent applications that are considered related to the present application, and regardless of whether there are other patent applications that share a claim of priority with the present application.

XI. Overview of Various Embodiments

The present application generally provides systems and methods for generating socially responsible investment trusts that comprise of neutralized securities. Socially responsible investments ("SRIs") are financial instruments that strive to maximize both financial return and social good. Typically, SRIs favor corporate practices that exercise environmental responsibility, support workplace diversity and increase product safety.

In general, socially responsible investors select investment securities based on four basic investment strategies, which may include: screening, divesting, shareholder activism, and community investment. A social investor may be any number of entities, including an individual or an institution. Some examples of a social investor may include: a corporation, a university, a hospital, a foundation, an insurance company, a pension fund, a nonprofit organization, a church or a synagogue. Any investor may be a socially responsible investor.

Before a socially responsible investor invests in a particular security, a screening process is conducted to determine whether the particular security qualifies as a SRI. During the screening process, the investor may apply a "filter" comprising various criteria, thresholds and tests (e.g., amount of carbon emissions) to the particular security of interest. Securities that pass the screening process are referred to, henceforth, as "qualifying securities", whereas the securities that fail the screening process are referred to, henceforth, as "non-qualifying securities". For example, certain SRIs may consider shares of ExxonMobil to be non-qualifying securities due to the fact that the company releases harmful carbon emissions into the environment.

Furthermore, a socially responsible investor may "divest," or remove, previously qualified securities from its portfolio, in the event that these previously qualified securities not longer meet the requirements for the fund.

Thus, one of the main challenges of socially responsible investing rests in the fact that a large number of financially lucrative securities are excluded from the investment pool due to a failure to meet one or more criteria. Thus, the present application has identified a way to improve the SRI selection process: a process that rehabilitates a non-qualifying security into a qualifying security. The process generates a socially responsible investment trust ("SRI trust") to hold these rehabilitated securities. Socially responsible investors then may purchase shares of the SRI trust for their investment portfolios.

The description below uses an example from an environmental industry to illustrate the application's teachings, but the application is not limited to this particular subject matter; the system may be used to rehabilitate non-qualifying securities from any number of industries that might be screened by a SRI. Some other examples of these industries may include alcohol, tobacco, gambling, defense/weapons, animal testing, products/services, human rights, labor relations and employment/equality issues.

Furthermore, although the present application uses the term "carbon emissions" in its various embodiments, the term "carbon" is understood to describe a variety of greenhouse gases, although not all of them are carbon-based. Some examples of these greenhouse gases include: carbon dioxide, methane, nitrous oxide and fluorinated gases, such as hydrofluorocarbons, perfluorocarbons, and sulfur hexafluoride.

The present application's teachings are applicable to a wide range of computer systems. However, it will be assumed, for the sake of concreteness, that the present application is being implemented in a system of the type depicted in FIG. 1.

A. System Hardware

Referring to FIG. 1, a system 100, according to at least one embodiment of the systems disclosed herein, includes at least one computing device, such as a remote computer 102, e.g., a server computer, a client computer 104, or a combination thereof. The term remote in this context merely means that the remote computer 102 and at least one of the client computers 104 are separate devices. Thus, the devices may be remote even if they are located within the same room. In at least one embodiment, the system includes at least one remote computer 102 that is connected over a communication network 106 to one or a plurality of client computers 104. One or more of the client computers 104 may be connected to the remote computer 102 through a firewall. In another embodiment, at least one remote computer 102 is connected over a communication network 106 to at least one other remote computer 108.

The system 100 may be implemented over any type of communications network 106, such as a local area network (LAN), a wide area network (WAN), the Internet, a telephone network (POTS), a wireless network, including cellular, WiFi, and WiMax networks, or a combination of wired and/or wireless networks. In certain instances, the communications network 106 may be independent of the Internet or limited with respect to the type of the information transmitted over the Internet, such as to information that poses little or no security risk if misappropriated or that has been encrypted.

In the networked embodiment, client computers 104 are preferably configured or otherwise capable of transmitting and/or receiving communications to and/or from the remote computer(s) 102, 108. The remote computers 102, 108 may similarly be configured or otherwise capable of transmitting and/or receiving communications between themselves. This may be accomplished with a communication element, such as a modem, an Ethernet interface, a transmitter/receiver, etc., that enables communication with a similarly equipped remote computer 102,108 wirelessly, wired, or a combination thereof. It is understood that the relative functionality described herein may be provided by the remote computers 102, 108, by the client computers 104, or both, and is thus not limited to any particular one of the implementations discussed herein. In at least one embodiment, the client computers 104 will generally provide the front-end functionality and the remote computer 102, 108 will provide the back-end functionality.

Although various embodiments may be described herein in relation to socially responsible investment trusts as a form of financial instrument, it is understood that the methods and systems disclosed herein are equally applicable to other types of financial instruments as well as non-financial instrument assets, such as commodities, money (in one or more currencies), goods, etc., and is thus not limited thereto. The term "financial instrument" denotes any instrument, issued by a corporation, government, or any other entity, that evinces dept or equity, and any derivative thereof, including equities, stocks, fixed income instruments, bonds, debentures, certificates of interest or deposit, warrants, options, futures, forwards, swaps, or generally any security.

The computing device, e.g., the client computers 104 and/or the remote computer 102, 108 generally include at least one processor, and a memory, such as ROM, RAM, FLASH, etc., including computer readable medium type memory, such as a hard drive, a flash-drive, an optical or magnetic disk, etc. The memory or computer readable medium preferably includes software stored thereon that when executed performs one or more steps of the methods disclosed herein, including communicating data and commands back and forth between the computers, displaying interface screens, etc. The computers may also be associated with or have access to one or more databases 110, 112 for retrieving and/or storing the various types of data discussed herein, including identity verification data, such as an ID and password, biometric data, etc.

The client computers 104 may include, without limitation, a mobile phone, PDA, pocket PC, personal computer, as well as any special or other general purpose computing device. As such, the client computer 104 preferably includes a processor, a memory, a display, such as a CRT or an LCD monitor, for displaying information and/or graphics associated with the functionality provided by the system 100, and at least one input device, such as a mouse, a touch-sensitive pad, a pointer, a stylus, a trackball, a button or a plurality of buttons, e.g., alphanumeric, a scroll wheel, a touch-sensitive monitor, etc., or a combination thereof, for users to enter commands and/or information relevant to the system's functionality. With the general purpose type of client computer 104, such as the PC or PDA, users may access the functionality provided by the system 100 with a browser application or any other generic application, or with special purpose software designed specifically for accessing the functionality disclosed herein.

In at least one embodiment, the client computer 104 includes or is otherwise associated with at least one biometric sensor 114. The biometric sensor 114 is any device that is used to determine directly from the user at least one item of biometric data associated with a user, such as a fingerprint reader, an iris scanner, a retinal scanner, a vascular pattern reader, a facial recognition camera, etc. The biometric sensor 114 may be embodied in hardware, software, or a combination thereof. The biometric sensor 114 may further share resources with other components of the client computer 104, such as the processor, memory, a camera, a microphone, a speaker, etc. A single biometric sensor 114 may be used for reading more than one type of biometric data. For example, a digital camera may be used to obtain an image of the user's eye for iris scanning and an image of the user's face for facial recognition. In this instance, a single image capture of the user's face may provide the data for facial recognition as well as data for iris or retinal comparisons.

The biometric data is generally obtained with the biometric sensor 114 and used at least to authenticate the identity of the user as a gateway for allowing the user to access the system's functionality. In this regard, biometric data may be compared with previously obtained/stored biometric data that has preferably been verified as being associated with a particular user and access to the system's functionality may be provided based on a positive match thereof.

B. Methods and Systems

According to at least one embodiment of the methods disclosed herein, the method begins with the system 100 receiving login information. The login information may be any information for use in authenticating a user and providing thereto one or more of the functions disclosed herein. The login information may be, for example, a user ID, password, biometric data, etc. The login information may be submitted by a user with a user interface screen that includes therein at least one form element, such as an input field or text box, a drop down list, check box, radio buttons, action buttons, clickable images, etc., for entering login data. Following submission, the login information may be compared with previously obtained information and access to one or more of the functions may be provided based on a positive match.

In at least one embodiment, the system 100 identifies one or more non-qualifying securities. In order to identify these non-qualifying securities, the system 100 initially selects one or more SRI funds of interest, i.e. SRI funds that the system 100 has identified as a desired client. These SRI funds may have been selected based on any number of factors, such as the size of the fund, the amount of money managed by the fund, the type of social cause supported by the SRI fund, etc.

After selecting a SRI fund of interest, the system 100 obtains the filter used by the selected SRI fund in order to determine which securities currently fall outside the investment pool. As described above, a filter comprises various criteria, thresholds and tests for screening a particular security. The system may obtain the filter from the SRI in any number of methods. In one embodiment, the filter is publicly known or published. In other embodiments, the system requests that a SRI fund of interest provide its filters. After acquiring the filter, the system 100 then analyzes the filter to identify the securities (and companies) that are excluded by the filter. Based on this information, the system 100 identifies the securities to be rehabilitated. These securities are referred to, henceforth, as "targeted securities." For example, the system 100 may identify a particular SRI fund, say Fund A, as a fund in which the system 100 would wish to have as a client. Fund A may have been selected for its high volume of activities, large budget, and/or specialization in environmental issues. The system 100 then obtains the filter used by Fund A, and based on this filter, determines that Fund A currently does not invest in the following industries: oil & gas, chemical & petrochemical manufacturing, and transportation. The system 100 then identifies the top players in each of these industries and seeks to neutralize the securities for these top industry players.

In some embodiments, the system 100 does not use a filter to determine the targeted securities. For instance, the system 100 may simply contact a SRI fund of interest and requests that the SRI fund provide a list of non-qualifying securities that it desires to rehabilitate.

In another embodiment, the SRI fund sua sponte submits a list of targeted securities to the system 100. In such instances, the system 100 provides a service of rehabilitating non-qualifying securities for SRI funds. For example, a SRI fund may desire to invest in a certain company, but that company falls outside the investment parameters as defined by the filter.

In another embodiment, the holders of non-qualifying securities may contact the system 100, and request that the system 100 rehabilitate the non-qualifying securities so that they may qualify for investment in a SRI fund. The holder of the non-qualifying securities also may sell the securities to the system 100, which in return rehabilitates the securities and repackages the rehabilitated security in a SRI trust. Shares of the SRI trust comprising of rehabilitated securities are then sold to various SRI funds.

After the system 100 has identified the non-qualifying securities of interest, the system then seeks to rehabilitate these non-qualifying securities. In one embodiment, the process of rehabilitating a non-qualifying security involves 1) calculating the carbon footprint of the non-qualifying security and 2) purchasing enough carbon credit to neutralize the calculated carbon footprint.

Generally, a carbon footprint represents the estimated emission of carbon dioxide ($CO_2$) and other greenhouse gases (GHGs) associated with activities conducted by an organization, enterprise or corporation as part of their everyday operations. A carbon footprint is commonly expressed as "$CO_2$ equivalents" or $CO_2e$ units. For example, a carbon footprint may be expressed as tons of carbon dioxide, or tons of carbon, emitted per year. Currently, there are many versions of carbon calculators available for carbon footprinting. Some examples of third-party providers that specialize in calculating carbon footprints include Environmental Resources Trust, Inc., Blue Source, LLC, and various others.

On the other hand, a carbon credit (measured in units of tones of C02) represents the act of reducing or avoiding GHG emissions in one place, in order to offset GHG emissions occurring somewhere else. GHGs generally mix well in the atmosphere and can travel around the planet quickly. As a result, it generally does not matter from the standpoint of global warming mitigation where a reduction takes place.

There are currently several different types of carbon credits. For example, one type of carbon credit is an allowance, which could be issued under the European Trading Scheme, the Kyoto Protocol, or various U.S. mandates, such as RGGI and AB 32 in California. Another type of carbon credit is a Certified Emissions Reduction (CER), which is a tradable certificate reflecting the reduction or avoidance of one tone of C02e. CERs are the currency used by the Clean Development Mechanism (CDM) under the Kyoto Protocol for GHG trading between developing countries (i.e., countries without emissions reduction targets) and industrialized countries (i.e., countries with emissions reduction targets).

Still another type of carbon credit is an Emission Reduction Unit (ERU), which is issued to parties participating in Joint Implementation (JI) projects. The JI projects also are conducted in accordance with the rules of the Kyoto Protocol. Still another type of carbon credit is a Verified Emission Reduction (VER), which is a reduction that occurs outside of a mandated program. Theses credits are generally created on a voluntary basis and are verified by an independent third party.

Carbon credits typically are generated from specific greenhouse gas reduction projects. As such, various carbon reduction practices create different levels of carbon reductions. As such, each type of GHGs has a different global warming potential (GWP) factor, so that, for example, one tonne of methane reduced is equivalent to twenty-three tons of $CO_2$. Some examples of carbon reduction projects that help generate carbon credits may include: forest sequestration, soil conservation, electric efficiency, fuel switching, animal waste recovery and landfill gas capture. Many other carbon reduction practices also exist, and some of these practices are described on the website "Climate Top 50," available at www.climatetop50.org, which is herein incorporated by reference.

In one embodiment, the system 100 submits the selected non-qualifying securities to a third-party provider of carbon footprints. The third-party provider calculates the carbon footprint for the non-qualifying security and transmits this information to the system 100. The system 100 then purchases the corresponding amount of carbon credits from another third-party source.

In another embodiment, the system 100 calculates the carbon footprint for the selected non-qualifying securities using various methods and formulas. One example of a carbon footprint formula may include: (1) calculating the total units of carbon emission generated by the company of the non-qualifying securities for the previous month; (2) dividing the total units of carbon emission by the total number of securities owned by the company for that previous month; and (3) multiplying the generated carbon footprint per share by the number of non-qualifying securities being sold in order to generate the amount of carbon credits necessary to neutralize the non-qualifying securities. It is unnecessary to obtain carbon credits for all of the carbon emissions generated by a company, since the system 100 needs only to neutralize the securities that it is purchasing.

There are many other industry standard methods for calculating the carbon footprint of a security. For example, some of the methods use to calculate the carbon emissions for Exxon Mobile Corporation are published in a publication entitled, "ExxonMobil Corporation Emissions Inventory 1882-2002: Methods & Results," published on Dec. 17, 2003, by Richard Heede, Climate Mitigation Services, Snowmass, Colo., hereby incorporated by reference.

The carbon footprint may be calculated for any number of time periods. In one embodiment, the carbon footprint is calculated on a monthly basis. In other embodiments, the carbon footprint is calculated on an annual basis. Still other embodiments may calculate the carbon footprint on a daily, weekly, biweekly, or any other incremental period of time.

Furthermore, the carbon footprint may be subject to change. For example, Company A may incorporate a new method (e.g., more environmentally sound) for performing its manufacturing, and as a result, Company A dramatically reduces its overall carbon emissions for that year. As a result, the carbon footprint calculated will be adjusted to accommodate these changes, since the new carbon footprint would require a lower number of carbon credits in order to neutralize the non-qualifying securities.

As described above, the system 100 may purchase the carbon credits from a third-party carbon credit provider, or from a trading exchange that sells carbon credits. The process of purchasing a carbon credit contains many similarities to the purchase of any commodity on the general market. For example, bilateral trades are a common occurrence, as is the possibility of purchasing the carbon credits on an electronic exchange.

In another embodiment, the system 100 works with various carbon reduction projects in order to generate its own carbon credits.

As described above, the location of a carbon reduction is typically irrelevant. However, in some embodiments, it may be desirable to place geographic constraints on the carbon credits. In these instances, the system 100 offers a specialized set of carbon credits, in which the carbon reduction projects occur within the same geographic location as where the carbon emissions are generated.

In other embodiments, the system 100 offers a blended carbon credit, in which some of the carbon reduction projects occur within the same geographic location as the carbon emission, and other carbon reduction products take place anywhere in the world.

In one embodiment, the system 100 neutralizes the non-qualifying securities for a fixed time-period, such as one-year. At the end of the year, an additional fee must be paid in order to maintain the qualifying security status. In other embodiments, the system 100 neutralizes the securities for its entire lifetime in the trust. As long as the securities remain in the SRI trust, the system 100 continues to supply the carbon credits to neutralize the securities.

In some embodiments, the system 100 will publish a memo detailing the methods and formulas used for calculating the carbon footprint and the source of the carbon credits. This memo is submitted to the shareholders of the SRI trust. In one embodiment, publication of the memo provides transparency to the system's activities, as well as instilling a sense of legitimacy in the neutralization process.

After the system 100 has obtained the appropriate amount of carbon credits to neutralize the non-qualifying securities, the system 100 then stores both the carbon credits and non-qualifying securities in a trust. As such, one share or unit of the trust comprises a share of the rehabilitated security (i.e., a share of the non-qualifying security combined with its corresponding carbon credit).

Socially responsible investors may purchase shares of the SRI trust, which now permits them to invest in companies that were previously excluded by the filters.

In another embodiment, the system 100 only provides a partial carbon credit to the non-qualifying securities. For example, the system 100 may provide a percentage (e.g., 50%) of the carbon credit necessary to neutralize the non-qualifying securities. In another embodiment, the system 100 provides a carbon credit in excess of that necessary to neutralize the non-qualifying securities.

In some embodiments, the system 100 has the capability to retire carbon credits, or take them off the market in order to reduce the overall limits to GHG emissions.

Further Embodiments

The following should be interpreted as embodiments, not claims.

A1. A method that comprises a computer system configured to: select a targeted investment fund from a plurality of investment funds; retrieve a filter associated with the targeted investment fund, in which the filter comprises at least one criteria for evaluating a security; generate a list of at least one targeted security, in which the at least one targeted security is excluded from the targeted investment fund based on the at least one criteria of the filter; calculate a carbon footprint of the targeted security; calculate an amount of carbon credit necessary to neutralize the carbon footprint; purchase the amount of carbon credit necessary to neutralize the carbon footprint; combine the targeted security with the purchased carbon credit in order to generated a rehabilitated security; and store the rehabilitated security in a trust.

A2. The method of embodiment A1, in which the act of calculating the carbon footprint comprises: calculating an amount of carbon emission generated for a period of time, in which the carbon emission is generated by an entity associated with targeted securities; calculating an amount of securities owned by the entity during the period of time; calculating an amount of targeted securities; dividing the amount of carbon emissions generated by the amount of securities to produce a carbon-to-security ratio; and multiplying the carbon-to-security ratio by the amount of targeted securities to produce the carbon footprint for the target securities.

A3. The method of embodiment A1, in which the carbon footprint represents an emission of greenhouse gases associated with activities performed by conducted by a corporate entity.

A4. The method of embodiment A1, in which the carbon footprint is measured in tons of carbon dioxide emitted.

A5. The method of embodiment A1, in which the carbon credit is generated from at least one greenhouse gas project.

A6. The method of embodiment A5, in which the greenhouse gas project comprises at least one of the following: forest sequestration, soil conservation, electric efficiency, fuel switching, animal waste recovery or landfill gas capture.

A7. The method of embodiment A1, in which the carbon credit comprises one of the following: an allowance, a certified emission reduction (CER), a emission reduction unit (ERU) or a verified emission reduction (VER).

A8. The method of embodiment A1, in which the act of purchasing the amount of carbon credit comprises: purchasing a percentage of the amount carbon credit necessary to neutralize the carbon footprint.

A9. The method of embodiment A1 further comprising: publishing a memorandum comprising at least one formula used for calculating the carbon footprint.

A10. The method of embodiment A9 further comprising: distributing the memorandum to at least one shareholder of the trust.

A11. The method of embodiment A9 further comprising: selling a share of the trust to the targeted investment fund.

B12. A storage medium containing machine instructions readable by a computer system that includes a data store to configure the computer system to: select a targeted investment fund from a plurality of investment funds; retrieve a filter associated with the targeted investment fund, in which the filter comprises at least one criteria for evaluating a security; generate a list of at least one targeted security, in which the at least one targeted security is excluded from the targeted investment fund based on the at least one criteria of the filter; calculate a carbon footprint of the targeted security; calculate an amount of carbon credit necessary to neutralize the carbon footprint; purchase the amount of carbon credit necessary to neutralize the carbon footprint; combine the targeted security with the purchased carbon credit in order to generated a rehabilitated security; and store the rehabilitated security in a trust.

B13. The storage medium of embodiment B12, in which the act of calculating the carbon footprint comprises: calculating an amount of carbon emission generated for a period of time, in which the carbon emission is generated by an entity associated with targeted securities; calculating an amount of securities owned by the entity during the period of time; calculating an amount of targeted securities; dividing the amount of carbon emissions generated by the amount of securities to produce a carbon-to-security ratio; and multiplying the carbon-to-security ratio by the amount of targeted securities to produce the carbon footprint for the target securities.

B14. The storage medium of embodiment B12, in which the carbon footprint represents an emission of greenhouse gases associated with activities performed by conducted by a corporate entity.

B15. The storage medium of embodiment B12, in which the carbon footprint is measured in tons of carbon dioxide emitted.

B16. The storage medium of embodiment B12, in which the carbon credit is generated from at least one greenhouse gas project.

B17. The storage medium of embodiment B15, in which the greenhouse gas project comprises at least one of the following: forest sequestration, soil conservation, electric efficiency, fuel switching, animal waste recovery or landfill gas capture.

B18. The storage medium of embodiment B12, in which the carbon credit comprises one of the following: an allowance, a certified emission reduction (CER), a emission reduction unit (ERU) or a verified emission reduction (VER).

B19. The storage medium of embodiment B12, in which the act of purchasing the amount of carbon credit comprises: purchasing a percentage of the amount carbon credit necessary to neutralize the carbon footprint.

B20. The storage medium of embodiment B12 further comprising: publishing a memorandum comprising at least one formula used for calculating the carbon footprint.

B21. The storage medium of embodiment B20 further configuring computer system to: distributing the memorandum to at least one shareholder of the trust.

B22. The storage medium of embodiment B12 further configuring computer system to: sell a share of the trust to the targeted investment fund.

C23. A method that comprises a computer system configured to: generate a list of at least one targeted security, in which the at least one targeted security is excluded from the targeted investment fund; purchase an amount of carbon credit necessary to neutralize a carbon footprint of the targeted security; combine the targeted security with the purchased carbon credit in order to generated a rehabilitated security; and store the rehabilitated security in a trust.

C24. The method of embodiment C23, in which the carbon footprint represents an emission of greenhouse gases associated with activities performed by conducted by a corporate entity.

What is claimed is:

1. An apparatus comprising: at least one processor; and
at least one memory storing instructions which, when executed by the at least one processor, direct the at least one processor to perform a method comprising:
selecting an investment fund from among a plurality of investment funds, the investment fund comprising an entity that buys, holds, and sells a plurality of different types of securities;
determining at least one security that is excluded from the investment fund;
calculating a carbon footprint of the at least one security, in which the act of calculating a carbon footprint comprises determining an estimated emission of at least one greenhouse gas associated with one or more activities conducted by at least one entity associated with the at least one security, the at least one greenhouse gas comprising carbon dioxide,
calculating an amount of carbon credit necessary to neutralize the carbon footprint of the at least one security;
purchasing an amount of carbon credit that is equal to the amount of carbon credit necessary to neutralize the carbon footprint of the at least one security;
generating a financial instrument determined to have a neutralized carbon footprint, in which the act of generating the financial instrument comprises causing the at least one security and the purchased amount of carbon credit to be stored in a trust; and
causing at least one share of the trust to be sold to the investment fund.

2. An apparatus comprising:
at least one processor; and
at least one memory storing instructions which, when executed by the at least one processor, direct the at least one processor to perform a method comprising:
determining at least one security that is excluded from an investment fund;
calculating a carbon footprint of the at least one security;
calculating a first amount of carbon credit necessary to neutralize the carbon footprint of the at least one security;
based on the act of calculating the first amount of carbon credit, causing a second amount of carbon credit to be purchased; and
generating a financial instrument determined to have an at least partially neutralized carbon footprint, in which the act of generating comprises causing the at least one security and the second amount of carbon credit to be stored in a trust.

3. The apparatus of claim 2, in which the instructions, when executed by the at least one processor, direct the processor to perform a method further comprising:
causing at least a portion of the trust to be sold to the investment fund, in which the investment fund comprises an entity that buys, holds, and sells a plurality of different types of securities.

4. The apparatus of claim 2, in which the first amount of carbon credit and the second amount of carbon credit are equal, and in which the act of generating a financial instrument comprises generating a financial instrument determined to have a neutralized carbon footprint.

5. The apparatus of claim 2, in which the act of generating a financial instrument comprises causing the at least one security and the second amount of carbon credit to be stored in a trust such that the trust has a carbon footprint that is less than the carbon footprint of the at least one security.

6. The apparatus of claim 2, in which the act of determining the at least one security comprises receiving from the investment fund an identification of the at least one security.

7. The apparatus of claim 2, in which the act of causing at least a portion of the trust to be purchased by the investment fund comprises causing at least one share of the trust to be purchased by the investment fund.

8. The apparatus of claim 2, in which the instructions, when executed by the at least one processor, direct the processor to perform a method further comprising:
before the act of determining the at least one security, selecting the investment fund from a plurality of investment funds based on at least one of a size of the fund, an amount of money managed by the fund, and a type of social cause supported by the fund.

9. The apparatus of claim 8, in which the instructions, when executed by the at least one processor, direct the processor to perform a method further comprising:
before the act of determining the at least one security, retrieving a filter associated with the investment fund, in which the filter comprises at least one criteria for evaluating carbon emission information associated with the security.

10. The apparatus of claim 9, in which the instructions, when executed by the at least one processor, direct the processor to perform a method further comprising:
before the act of determining the at least one security, generating a list comprising the at least one security, in which the at least one security is excluded from the investment fund based on the at least one criteria of the filter.

11. The apparatus of claim 2, in which the at least one security consists of one security.

12. The apparatus of claim 2, in which the at least one security comprises a plurality of securities excluded by a filter associated with the investment fund.

13. The apparatus of claim 2, in which the second amount of carbon credit is greater than the first amount of carbon credit.

14. The apparatus of claim 2, in which the second amount of carbon credit is less than the first amount of carbon credit.

15. The apparatus of claim 2, in which the act of purchasing the amount of carbon credit comprises purchasing a percentage of the amount of carbon credit necessary to neutralize the carbon footprint.

16. The apparatus of claim 2,
in which the act of calculating a carbon footprint of the at least one security comprises determining an estimated emission, during a first predetermined period of time, of at least one greenhouse gas associated with one or more activities by at least one entity associated with the at least one security, the at least one greenhouse gas comprising carbon dioxide;
in which the act of calculating a first amount of carbon credit comprises calculating an amount of carbon credit necessary to neutralize, during the first predetermined period of time, the carbon footprint of the at least one security;
in which the act of causing a second amount of carbon credit to be purchased comprises causing an amount of carbon credit necessary to neutralize, during the first predetermined period of time, the carbon footprint of the at least one security; and
in which the act of generating a financial instrument determined to have an at least partially neutralized carbon footprint comprises generating a financial instrument determined to have, during the first predetermined period of time, a neutralized carbon footprint.

17. The apparatus of claim 16, in which the instructions, when executed by the at least one processor, direct the processor to perform a method further comprising:
causing at least one share of the trust to be sold to the investment fund;
after causing the at least one share of the trust to be sold to the investment fund, causing a third amount of carbon credit to be purchased; and
causing the third amount of carbon credit to be stored in the trust.

18. The apparatus of claim 16, in which the instructions, when executed by the at least one processor, direct the processor to perform a method further comprising:
causing at least one share of the trust to be sold to the investment fund;
after causing the at least one share of the trust to be sold to the investment fund, calculating a second carbon footprint of the at least one security for a second predetermined period of time;
calculating a third amount of carbon credit necessary to neutralize, during the second predetermined period of time, the second carbon footprint of the at least one security for the second predetermined period of time;
causing the third amount of carbon credit to be purchased; and
causing the third amount of carbon credit to be stored in the trust.

19. The apparatus of claim 16, in which the instructions, when executed by the at least one processor, direct the processor to perform a method further comprising:
causing at least one share of the trust to be sold to the investment fund;
after causing the at least one share of the trust to be sold to the investor, receiving from the investment fund a fee to maintain a neutralized status of the trust.

20. The apparatus of claim 2, in which the act of calculating the carbon footprint comprises determining an estimated emission of at least one greenhouse gas.

21. The apparatus of claim 19, in which the estimated emission of the at least one greenhouse gas comprises an estimated amount of emission associated with one or more activities conducted by an entity associated with the security.

22. The apparatus of claim 21, in which the at least one greenhouse gas comprises carbon dioxide.

23. The apparatus of claim 2, in which the act of calculating the carbon footprint comprises:
calculating an amount of carbon emission generated for a period of time, in which the carbon emission is generated by an entity associated with the at least one security;
calculating an amount of securities owned by the entity during the period of time;
calculating an amount of the at least one security;
determining a carbon-to-security ratio based on a quotient of (1) the amount of carbon emission generated divided by (2) the amount of securities; and
determining the carbon footprint for the at least one security by multiplying the carbon-to-security ratio by the amount of the at least one security.

24. The apparatus of claim 2, in which the at least one security comprises a security issued by a corporate entity, and in which the carbon footprint represents an emission of greenhouse gases associated with one or more activities of the corporate entity.

25. The apparatus of claim 2, in which the carbon credit is generated from at least one greenhouse gas project comprising at least one of the following: forest sequestration, soil conservation, electric efficiency, fuel switching, animal waste recovery or landfill gas capture, and
in which the carbon credit comprises one of the following: an allowance, a certified emission reduction (CER), an emission reduction unit (ERU) or a verified emission reduction (VER).

26. The apparatus of claim 2, in which the instructions, when executed by the at least one processor, direct the processor to perform a method further comprising:
publishing a memorandum comprising at least one formula used for calculating the carbon footprint; and
distributing the memorandum to at least one shareholder of the trust.

27. A method comprising:
selecting by at least one processor an investment fund from a plurality of investment funds;
retrieving by the at least one processor a filter associated with the investment fund, in which the filter comprises at least one criteria for evaluating a security;
generating by the at least one processor a list of at least one security, in which the at least one security is excluded from the investment fund based on the at least one criteria of the filter;
calculating by the at least one processor a carbon footprint of the at least one security;
calculating by the at least one processor an amount of carbon credit necessary to neutralize the carbon footprint;
causing by the at least one processor a purchase of the amount of carbon credit necessary to neutralize the carbon footprint;

storing by the at least one processor the at least one security and the purchased carbon credit in a trust; and causing by the at least one processor at least one share of the trust to be sold to the investment fund.

28. The method of claim 27, in which the act of calculating the carbon footprint comprises:

calculating an amount of carbon emission generated for a period of time, in which the carbon emission is generated by an entity associated with the at least one security;

calculating an amount of securities owned by the entity during the period of time;

calculating an amount of the at least one security;

determining a carbon-to-security ratio based on the quotient of (1) the amount of carbon emission generated divided by (2) the amount of securities; and multiplying the carbon-to-security ratio by the amount of the at least one security to produce the carbon footprint for the at least one security.

29. A method comprising:

determining, by at least one processor, at least one security that is excluded from an investment fund;

calculating, by the at least one processor, a carbon footprint of the at least one security;

calculating, by the at least one processor, a first amount of carbon credit necessary to neutralize the carbon footprint of the at least one security;

based on the act of calculating the first amount of carbon credit, causing, by the at least one processor, a second amount of carbon credit to be purchased; and generating, by the at least one processor, a financial instrument determined to have an at least partially neutralized carbon footprint, in which the act of generating comprises causing the at least one security and the second amount of carbon credit to be stored in a trust.

* * * * *